No. 827,996. PATENTED AUG. 7, 1906.
W. F. ROPER.
PICKING MECHANISM FOR LOOMS.
APPLICATION FILED MAR. 22, 1906.

Witnesses,
Edward H. Allen.
Walter R. Trott

Inventor,
Walter F. Roper,
by Charley Gregory
Attys.

THE NORRIS PETERS CO., WASHINGTON, D. C.

UNITED STATES PATENT OFFICE.

WALTER F. ROPER, OF HOPEDALE, MASSACHUSETTS, ASSIGNOR TO DRAPER COMPANY, OF HOPEDALE, MASSACHUSETTS, A CORPORATION OF MAINE.

PICKING MECHANISM FOR LOOMS.

No. 827,996.     Specification of Letters Patent.     Patented Aug. 7, 1906.

Application filed March 22, 1906. Serial No. 307,317.

*To all whom it may concern:*

Be it known that I, WALTER F. ROPER, a citizen of the United States, residing in Hopedale, county of Worcester, and State of Massachusetts, have invented an Improvement in Picking Mechanism for Looms, of which the following description, in connection with the accompanying drawings, is a specification, like numerals on the drawings representing like parts.

This invention has for its object the production of novel and simple mechanism for picking the shuttle of a loom back and forth through the shed, a gradual acceleration being imparted to the picker-stick on its active stroke, while obviating the use of a picking-cam having an abrupt or sudden rise.

As is well known to those skilled in the art, the usual picking-cam has its impact-face shaped to present a hard or abrupt rise to give to the picking-shaft a sudden and rapidly-accelerated but short rocking movement. A similar rapid but short acceleration is given to the picker-stick on its active stroke, and when the shuttle travel is long it is extremely difficult in practice to effect the desired acceleration of the shuttle while engaged by the picker.

By my present invention I am enabled to secure by very simple means a gradual and extended acceleration of the movement of the picker-stick on its active stroke while using a picking-cam having its impact-face provided with an easy rise, so that the shuttle remains in engagement with the picker for the greater portion of the active stroke.

The harsh action and the jar and shock due to the cam with an abrupt rise are obviated by my invention, the novel features of which are fully described in the subjoined specification, and particularly pointed out in the following claims.

Figure 1:
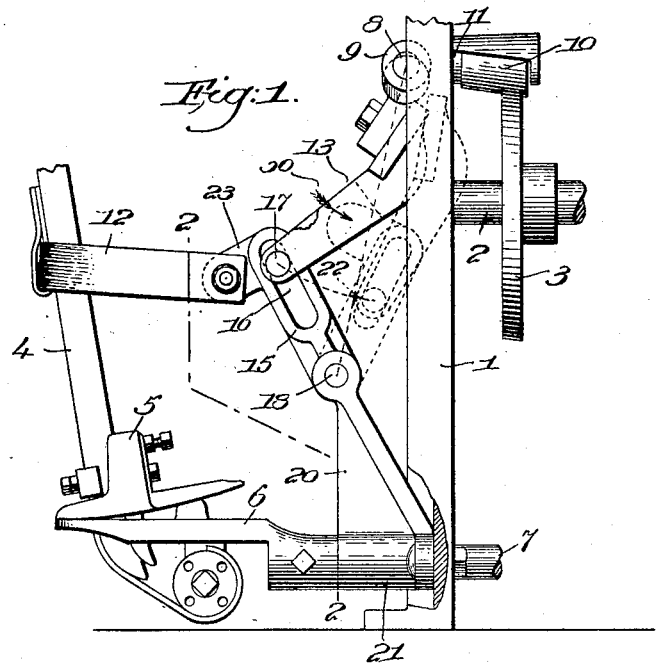
Figure 2:
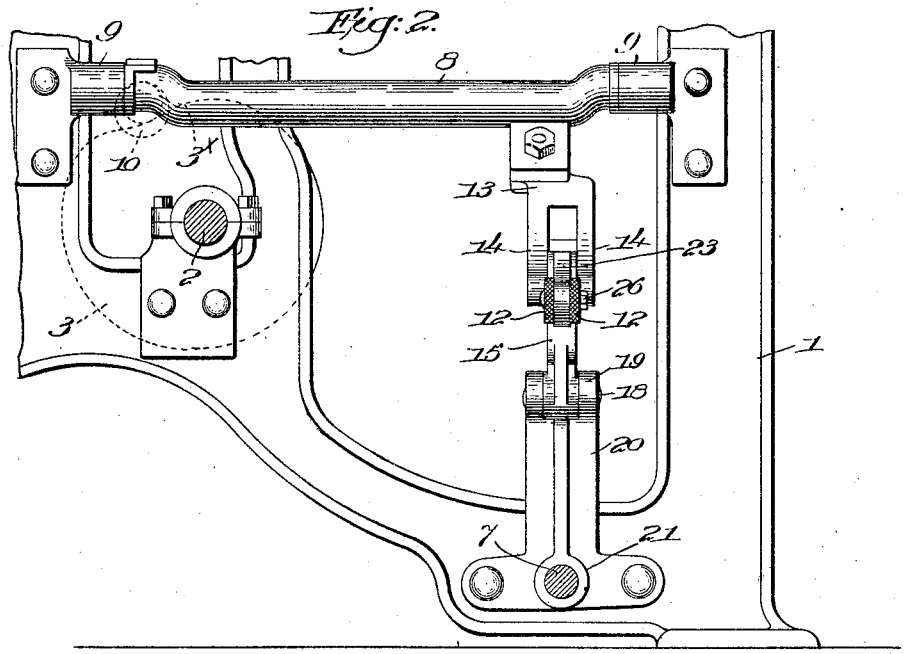
Figure 3:
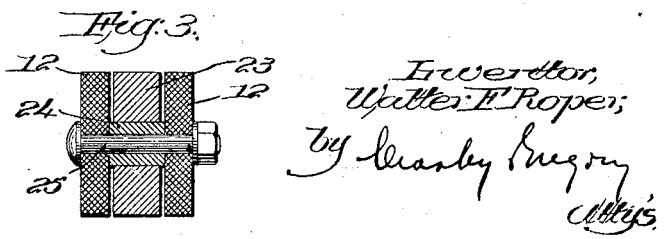

Figure 1 is a front elevation of loom-picking mechanism embodying one form of my invention, such mechanism being provided at each side of the loom. Fig. 2 is a left-hand side elevation of the mechanism shown in Fig. 1 and at the right of the irregular line 2 2, Fig. 1. Fig. 3 is an enlarged detail of the pivotal connection between the lug-strap and one of the members of the picking mechanism.

The loom side 1, cam-shaft 2, on which the picking-cam 3 is secured, the picker-stick 4, having a shoe 5, to rock on the stand 6, connected with the lay rocker-shaft 7, the picking-shaft 8, mounted to rock in bearings 9 on the loom-frame, the conical bowl or roll 10 on an arm 11, extended from the picking-shaft, and the flexible lug-strap 12 may be and are all substantially of well-known construction and operation, save that, as shown in Fig. 2, the picking-cam 3 has a very easy rise $3^\times$.

In the present embodiment of my invention a downwardly-extended arm 13 is secured to the picking-shaft 8 and bifurcated at its free end, Fig. 2, to receive loosely between the cheeks 14, formed by the bifurcation, the free end of a radius member or arm 15, having a longitudinal slot 16, Fig. 1, through which passes easily a stud or roll 17, mounted at its ends in the cheeks 14. Said slot and stud or roll constitute a movable or longitudinally-slidable connection between the free ends of the arms 13 and 15. The radius-arm 15 is fixedly fulcrumed at its lower end at 18 between ears 19 on a bracket 20, fixedly attached to the loom side and having a bearing 21 for the rocker-shaft 7.

When the picker-stick is at the outer end of its active or picking stroke, as in Fig. 1, the arms 13 and 15 are at an angle to each other, the connection between the arms being at its greatest distance outwardly away from a line connecting the fulcra of the arms. On the pick the arm 13 is swung downward and inward in direction of arrow 50, Fig. 1, and manifestly the radius-arm will be swung inward on its fulcrum 18; but the slidable connection between the arms will move longitudinally of the radius-arm toward its fulcrum until said connection is in line with both fulcra at the point 22, Fig. 1. As such connection thus gradually approaches the fulcrum of the radius-arm, the latter will have a gradually-accelerated movement on its inward or active stroke from the beginning of such stroke to the point 22, such acceleration extending through the major part of the stroke, as will be clear from Fig. 1, such acceleration being equal to about eighty per cent. of the stroke. Consequently the picker-stick connected with the radius-arm by the flexible connection 12 will have a corresponding acceleration on its active stroke and with a picking-cam having a very easy contour at the rise.

The shuttle remains in contact with the picker during the major portion of the stroke of the latter, and the gradual acceleration imparted during such extended portion of its movement effects the desired throw of the shuttle even though the travel be long, as on a broad loom.

At the free end of the radius-arm 15 an outwardly-extended ear 23 is provided, in which a transverse sleeve 24, Fig. 3, is mounted to rock, the sleeve being longer than the thickness of the ear, and the ends of the lug-strap 12 are brought against the ends of the sleeve. A bolt 25 passes through the ends of the lug-strap and through the sleeve, the nut 26 clamping the strap tightly to the ends of the sleeve, while a free pivotal connection is provided between the strap and the ear 23. The picking stroke of the picker-stick is effected through the flexible connection 12 between the stick and the radius-arm. The bracket 20 not only serves as a rigid firm support for the fixed fulcrum of the radius-arm, but it is also utilized to provide a bearing for the lay rocker-shaft.

My invention is not restricted to the precise construction shown and described, as the same may be modified or rearranged in different particulars by those skilled in the art without departing from the spirit and scope of my invention.

Having fully described one embodiment of my invention, what I claim as new, and desire to secure by Letters Patent, is—

1. In picking mechanism for looms, a picking-shaft having an attached arm means to rock said shaft, a picker-stick, a radius-arm operatively connected therewith and having a fixed fulcrum, and a connection between said arms movable toward the fulcrum of the radius-arm during the major portion of the active stroke of the picker-stick, to gradually accelerate the movement thereof during such period.

2. In picking mechanism for looms, a picking-shaft having an attached arm means to rock said shaft, a picker-stick, a radius-arm having a fixed fulcrum and operatively connected at its free end with the picker-stick, and a sliding connection between said arms and movable from the free end of the radius-arm toward its fulcrum on the pick, to gradually accelerate the movement of the picker-stick through the major part of its active stroke.

3. In picking mechanism for looms, a picking-shaft having an attached arm and a roll, a picking-cam having a relatively easy rise to coöperate with the roll and rock the shaft and its attached arm, a picker-stick, a radius-arm having a fixed fulcrum and operatively connected with the picker-stick, and a connection between the free ends of the arms, movable from the outer end of the radius-arm toward its fulcrum on the pick, to gradually accelerate the movement of the picker-stick on its active stroke.

4. In picking mechanism for looms, a picking-shaft having an attached arm, means to rock said shaft, a picker-stick, a longitudinally-slotted radius-arm having a fixed fulcrum and operatively connected with the picker-stick, and a stud on the picker-shaft arm entering the slot and movable toward the fulcrum on the pick, to gradually accelerate the angular movement of said radius-arm and the picker-stick on its active stroke.

5. In a loom, a lay rocker-shaft, a picker-stick mounted thereon, a fixed bracket forming a bearing for said rocker-shaft, a radius-arm fulcrumed on the bracket and flexibly connected at its free end with the picker-stick, a picking-shaft having an attached arm, a connection between the latter and the radius-arm and longitudinally movable on the latter, and means to rock the picking-shaft, the movement of the connection between the arms toward the fulcrum of the radius-arm accelerating the movement of the latter on the picking stroke.

6. In picking mechanism for looms, two swinging arms having fixed fulcra, a connection between the free ends of the arms and movable longitudinally of one of them toward and from its fulcrum, a picker-stick operatively connected with the latter arm, and means to rock the other arm, the movable connection causing a gradual acceleration of the arm connected with the picker-stick on the active stroke of the latter.

7. In picking mechanism for looms, a picker-stick, an arm operatively connected therewith and having a fixed fulcrum, and actuating means for said arm having a sliding engagement therewith longitudinally of the arm and gradually approaching the fulcrum thereof from the start to a predetermined point in the active stroke of said arm, to gradually accelerate the movement of the picker-stick on such stroke.

8. In picking mechanism for looms, a picking-cam having an easy rise, a picker-stick, a swinging member operatively connected therewith and having a fixed fulcrum, and means operated by said cam and having a longitudinally-movable connection with the swinging member, to actuate the latter, the connection moving toward the fulcrum thereof on the pick to gradually accelerate the movement of said member and the picker-stick on the active stroke thereof.

In testimony whereof I have signed my name to this specification in the presence of two subscribing witnesses.

WALTER F. ROPER.

Witnesses:
GEORGE OTIS DRAPER,
ERNEST W. WOOD.